E. C. ABLAHADIAN.
CHEMICAL LABORATORY APPARATUS.
APPLICATION FILED FEB. 16, 1922.
1,435,367.
Patented Nov. 14, 1922.
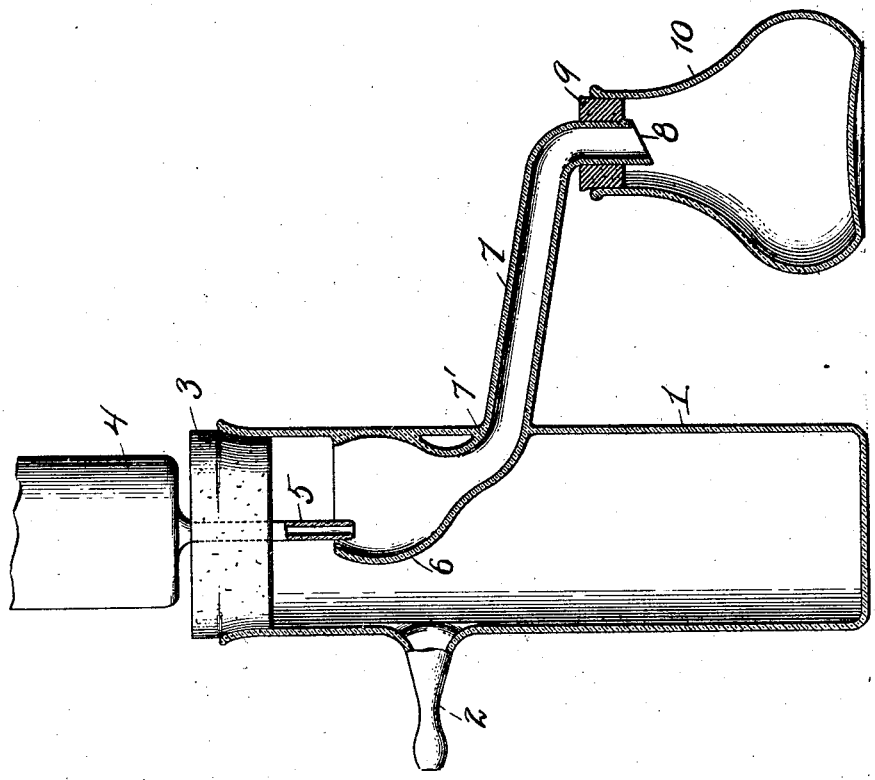
Inventor
ELEEZA C. ABLAHADIAN,
By E. T. & F. F. Brandenburg,
Attorney Patented Nov. 14, 1922.

1,435,367

UNITED STATES PATENT OFFICE.

ELEEZA C. ABLAHADIAN, OF GLENDALE, CALIFORNIA.

CHEMICAL LABORATORY APPARATUS.

Application filed February 16, 1922. Serial No. 536,974.

*To all whom it may concern:*

Be it known that I, ELEEZA C. ABLAHADIAN, residing at Glendale, in the county of Los Angeles, in the State of California, and a citizen of the Republic of Armenia, have invented certain new and useful Improvements in Chemical Laboratory Apparatus, of which the following is a specification.

My invention is a device, in the nature of an improved form of filtering cylinder, which I term "The Ablahadian filtering cylinder," adapted to be used in connection with the well-known Berkefeld filter commonly employed in most biological, bacteriological, and chemical laboratories.

The Berkefeld filter is used to filter and so mechanically remove bacteria and other substances from liquids employed in the preparation of solutions of organo-therapeutic products, nucleo-proteins, etc., thus sterilizing such liquids.

For the purpose mentioned, the Berkefeld filter is very necessary; but, in my experience at the Loomis laboratory of Cornell University, New York, I encountered certain difficulties with the apparatus ordinarily used in connection with the Berkefeld filter.

Solutions that do not filter spontaneously, or do so very slowly, must be drawn through the Berkefeld filter by suction. For this purpose, a filtering flask is employed, which is adapted to be connected with a flexible hose leading from a suction pump. Such a filtering-flask, as ordinarily constructed, is provided with a tight-fitting, perforated rubber stopper, the lower end of the Berkefeld filter being adapted to project through the perforation in the stopper and into the filtering-flask. Inside the filtering flask, and adapted to receive the filtrate issuing from the Berkefeld filter, is placed a sterile test-tube, or the like. Of course, it will be understood that the entire apparatus is sterilized to begin with, and the whole process of filtering is carried on with rigid precautions of sterility. A flexible tubing being connected with the filtering-flask, and the suction pump connected with such tubing being started into operation, a vacuum is created inside the filtering-flask, which draws the solution in the Berkefeld filter through its core into the test-tube in the flask.

As soon as the test-tube is filled, it is necessary to stop the operation of the pump, to break the vacuum. The rubber stopper is then withdrawn from the flask, to permit removal of the test-tube, so that it may be emptied and returned to the flask. The rubber stopper is then replaced, and the operation of exhausting the air from the flask and thus creating a vacuum is then repeated. All this is done with the necessary precautions as to sterility. The procedure, necessitated by the construction of the filtering-flask, is clumsy, tiresome, and tedious, and there is a reasonable risk of contaminating the filtrate when the test-tube is removed from the flask.

To obviate these difficulties and especially to prevent the quite obvious risk of contamination resulting from the procedure as above outlined, I have devised a filtering cylinder of novel construction, in that it is provided with a funnel attachment, the mouth of which is inside the cylinder and the hollow leg or stem projecting through the cylinder, so that a test-tube may be used exteriorly, instead of interiorly, of the cylinder, as more fully appearing hereinafter.

My invention has proved a very satisfactory substitute for the old form of apparatus above described, with the advantages, inter alia, that the entire amount of solution to be filtered through the Berkefeld can be filtered into a receiving-receptacle of similar capacity and dimensions, without interrupting the operation of the pump from time to time (as is necessary with the old construction of apparatus); and that the risk of contaminating the sterile filtrate is eliminated.

For a fuller understanding of my invention, reference may now be had to the accompanying drawing, forming part of my specification, and in which the view is a central vertical section through a filtering-cylinder constructed in accordance with my invention, and shown in operative relation with a Berkefeld filter (shown fragmentarily and in elevation, partly in section) and a receiving-receptacle (also shown in central vertical section). The drawing illustrates the preferred embodiment of my invention, capable of carrying out the underlying principles thereof.

Referring, now, in detail, to the drawing:

1 designates my improved filtering-cylinder, provided with a bottom and an open